United States Patent [19]

Wetter

[11] 4,353,286
[45] Oct. 12, 1982

[54] HYDRAULIC CONTROL SYSTEM WITH A PIPELINE ANTIBURST SAFETY DEVICE FOR A DOUBLE ACTING DRIVE CYLINDER

[75] Inventor: Jacob Wetter, Düsseldorf, Fed. Rep. of Germany

[73] Assignee: MDS Mannesmann Demag Sack GmbH, Düsseldorf, Fed. Rep. of Germany

[21] Appl. No.: 166,451

[22] Filed: Jul. 7, 1980

[30] Foreign Application Priority Data

Jul. 17, 1979 [DE] Fed. Rep. of Germany ....... 2928737

[51] Int. Cl.³ .......................................... F15B 13/042
[52] U.S. Cl. .......................................... 91/5; 60/413; 91/445; 137/486; 137/498; 164/413
[58] Field of Search ............... 91/5, 445, 447; 60/413; 137/460, 486, 498; 164/413

[56] References Cited

U.S. PATENT DOCUMENTS

| | | | |
|---|---|---|---|
| 3,891,025 | 6/1975 | Bollig et al. | 164/413 |
| 4,004,607 | 1/1977 | Freese | 137/498 X |
| 4,165,675 | 8/1979 | Cryder et al. | 91/445 X |
| 4,202,174 | 5/1980 | Grigorenko et al. | 91/5 X |

FOREIGN PATENT DOCUMENTS 2639225 3/1977 Fed. Rep. of Germany .
2712076 3/1977 Fed. Rep. of Germany .

Primary Examiner—Irwin C. Cohen
Attorney, Agent, or Firm—John J. Dennemeyer

[57] ABSTRACT

A hydraulic control system with a pipeline antiburst safety device for a double acting drive cylinder, more particularly for adjusting and securing the position of a driven guide roller in the strand guide of a continuous casting plant which exerts an operationally conditioned reaction force, applied by the strand, on the piston of the drive cylinder. To prevent this reaction force causing the guide roller to retract in the event of a pipe burst, the control system substantially comprises a leakage-proof stop valve of cartridge construction disposed close to the drive cylinder and within the main control duct a leakage proof pilot valve situated close to the stop valve and having a spring-biased spool and a pressure retaining accumulator to maintain the pressure in the adjusting cylinder in the event of pressure failure in the main control duct, and a valve spool of the stop valve has three control surfaces and under normal position is in the closed position under the light pressure exerted by a compression spring which pressure can be overcome by an operationally conditioned pressure rise in the drive cylinder but in the event of a pipe burst the pilot valve changes over and momentarily replaces the absent pressure in the main control duct, normally biasing the control surface of the stop valve spool, by the pressure from the pressure retaining accumulator so that the stop valve remains in the closed position.

5 Claims, 2 Drawing Figures

HYDRAULIC CONTROL SYSTEM WITH A PIPELINE ANTIBURST SAFETY DEVICE FOR A DOUBLE ACTING DRIVE CYLINDER

BACKGROUND OF THE INVENTION

1. Field of the Invention

The invention relates to a hydraulic control system with a pipeline antiburst safety device for a double acting drive cylinder for adjusting and securing the position of a machine part, more particularly a driven guide roller in the strand guide of a continuous casting plant, where such machine part exerts an operationally conditioned reaction force on the piston of the cylinder.

2. Discussion of Related Art

Drive cylinders, which do not perform any motion in their operating state, and therefore have merely a "pressure retaining function" can be protected, in the simplest case by means of a non-return valve, against a pipe burst in a pressurized pipeline. Inflow to the cylinder delivery surface is possible but reverse flow in the event of a pipe burst is prevented by virtue of the non-return valve valve cone being already in the closed position. The safety function is insured without the non-return valve performing a control function. If the working pressure in the pressurized pipeline upstream of the non-return valve has collapsed as a result of a pipe burst, it is possible for the pressure required on the cylinder delivery surface to be maintained by means of a pressure retaining accumulator which is connected via an additional non-return valve to the interconnecting pipeline between the pipeline antiburst non-return valve and the drive cylinder.

However, in cases in which the drive cylinder is to "breathe" during its operating state or is even to move to maintain a constant pressure, it will be necessary for the drive cylinder to be connected to the pressure source via an opened valve, for example, an unlockable non-return valve, which said valve must be kept open during normal operation and is closed in the event of a pipe burst by an active control function. This control function is triggered by a signal which depends on pressure drop or a change of volumetric flow. During the time which elapses between a pipe burst and the controlled closing of the unlockable non-return valve, the cylinder surface of the drive cylinder will be subjected to a brief pressure drop, combined with a deflection of the cylinder piston, until the pressure in the drive cylinder is restored after the stop valve is closed.

Such a retraction of the piston in a hydraulic adjusting cylinder is particularly undesirable if the drive cylinder is used for adjusting and securing the position of a driven guide roller in the strand guide of a continuous casting plant. Retraction of the strand guide rollers in this region as a result of a pipe fracture leads to strand bulges and strand fractures, usually entailing a prolonged stoppage of the continuous casting plant. Since the drive cylinders of the guide rollers in a strand guide are connected via opened control valves to the pressure source during the casting process, which said pressure source normally comprises pressure control pumps and a system of pressure accumulators, in order to compensate for internal and external leakages in the control system and on the cylinder, it follows that in addition to the previously mentioned disadvantages concerned with the retraction of the guide rollers, such a pipe or hose burst also results in pressure medium being discharged from the bursting place until the attention of the operating personnel is directed to the burst. The discharging hydraulic fluid may be the cause of a fire since the burst usually occurs near the strand which is still red hot.

SUMMARY OF THE INVENTION

The invention proceeds from the assumption of a pipeline antiburst safety device with an active control function, i.e. it is based on a hydraulic control system which permits the drive cylinder to "breathe" during operation while high pressure from the pressure source is applied. It is the object of the invention to avoid retraction of the piston associated with the adjusting cylinder during the active control functions which are required to close the stop valve in the event of a pipe burst. In other words, although the piston of the drive cylinder is able to perform the deflecting motions as a result of a varying, operationally conditioned reaction force during the normal operating condition and under constant pressure from the pressure source, it is intended that in the event of a pipe burst the hydraulic pressure in the cylinder is maintained irrespective of the duration of the active control function required to close the stop valve.

The invention ensures that the stop valve is always in the closed position which can be described as a "quasi closed position" since it permits "breathing" of the drive cylinder when the pressure in the cylinder pressure chamber of the drive cylinder is increased during normal operation. The essential feature is, that the stop valve is already in the closed position if the active control function to change over the pilot valve is initiated by a pipe burst and the said closed position is also fixed by the reversed pilot valve when the pressure retaining accumulator comes into action. If the hydraulic control system according to the invention is used to control drive cylinders of guide rollers in a guiding device for continuous casting it therefore offers the advantage that the strand is not subjected to bulging and the risk of strand fracture is thus reduced. Since each of the guide rollers in a continuous casting plant are usually adjusted by means of a pair of drive cylinders against fixed stop abutments which define the thickness of the strand that is to be produced, it follows that the function of "breathing" of the drive cylinders is intended rather for the driven guide rollers which are also used to convey the cold strand or the initial strand.

The non-return valve, arranged parallel with the normally closed stop valve, permits flow from the first main control duct to the cylinder in the course of a controlled adjusting motion.

The third control position which is provided on the main control valve in both main control ducts extending through the driving cylinder is intended to relieve both main control ducts in the event of a pipe burst and ensures that in such an event both control ducts are depressurized and the discharge of hydraulic oil at the place of fracture and therefore the risk of fire is minimized.

The stop valve and the pilot control valve are to be constructed in leak-proof manner so that these valves have the same high degree of functional reliability as the drive cylinder itself.

The pressure limiting valve between the high-pressure and low-pressure side of the adjusting cylinder prevents temperature increases from giving rise to an excessive pressure on the high-pressure side of the adjusting cylinder and is known.

BRIEF DESCRIPTION OF THE DRAWINGS

One embodiment of a hydraulic control system with a pipeline antiburst safety device according to the invention is illustrated in the accompanying drawing in which.

DETAILED DESCRIPTION OF THE PREFERRED EMBODIMENT

Figure 1:
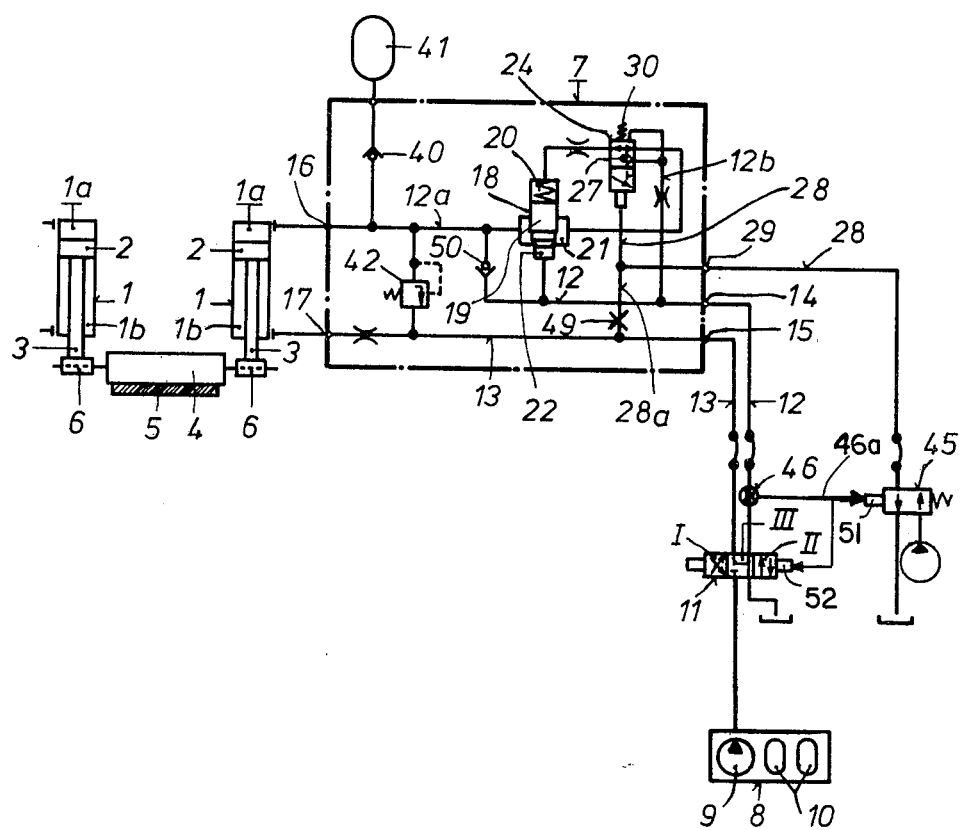
FIG. 1 shows a simplified circuit of the control system in conjunction with a drive cylinder for a guide roller in a continuous casting plant and FIG. 2 is a partial view of FIG. 1, showing the stop valve and the pilot control valve, which is shown in section.

The hydraulic control system illustrated in FIG. 1 with a pipeline antiburst safety device is intended to actuate a pair of drive cylinders 1 with pistons 2 and piston rods 3 for a driven guide roller 4 in the strand guide device of a continuous casting plant for slabs 5. The piston rods 3 of both drive cylinders 1 thrust on diagrammatically illustrated bearings 6 of the guide roller 4. Each drive cylinder 1 is associated with a pipeline antiburst safety device 7 which is surrounded by dash-dot lines and in practice represents a control block on which a drive cylinder 1 is directly flange mounted. Both double acting drive cylinders 1 are associated with a common hydraulic control system for the reversible adjusting motions of the piston rods 3.

The hydraulic control system comprises a high-pressure source 8 with a variable-delivery pump 9 and pressure accumulators 10 adapted to supply an adjustable constant hydraulic working pressure. The high-pressure source 8 is associated with a main control valve 11 having the control positions I, II and III. The control positions I and II are provided for the alternate control of the main control ducts 12 and 13 to working pressure and the return motion so that the drive cylinders 1 can perform adjusting motions for the piston rods 3 in both directions and the middle control position III is provided to relieve both main control ducts in the event of a pipeline burst. In the control position I, the main control duct 12 is pressurized and extends via each of a pipeline antiburst safety device 7 into the delivery chamber 1a of the cylinders 1 in order to maintain the thrust of a guide roller 4 against the slab 5 with an adjustable, constant force.

The core of the hydraulic control system according to the invention, the pipeline antiburst safety device 7, will be explained hereinbelow only in conjunction with one of the two drive cylinders 1. The pipeline antiburst safety device has two inlets 14, 15 for the two main control ducts 12, 13 and corresponding outlets 16 and 17 which extend into the two delivery chambers 1a and 1b of one of the two drive cylinders 1. The pipeline antiburst safety device 7 comprises a leakage-proof stop valve 18 of cartridge construction which is disposed close to the said cylinder because the drive cylinder 1 is directly flange mounted to the pipeline antiburst safety device. The said stop valve 18 is therefore connected within the first main control duct 12, which normally conducts working pressure and merges at 14 into the pipeline antiburst safety device and whose operating pressure in the delivery chamber 1a of the cylinder 1 acts opposite to an operationally defined reaction force which bears from the guide roller 4 on the piston 2 of the cylinder 1. The pipeline extension of the main control duct 12 within the pipeline antiburst safety device downstream of the stop valve 18 is designated with the numeral 12a.

The stop valve 18 comprises a valve spool 19 with three control surfaces, namely a largest surface F1 which is spring biased by a spring 20 in the closing direction, an annular surface F2 within an annular chamber 21 of the non-return valve 18, the outlet side of which communicates via the pipeline extension 12a with the corresponding working pressure chamber 1a in the drive cylinder 1, and an end face F3 on the seat side with a delivery chamber 22 into which the main control duct 12 extends. The largest piston surface area F1 is equal to the sum of the two other piston surface areas F2+F3, so that the valve spool 19 closes exclusively under the slight thrust of the compression spring 20, which acts on the largest piston surface area F1 and is kept closed when all spool surfaces are biased by the same hydraulic pressure.

Figure 2:
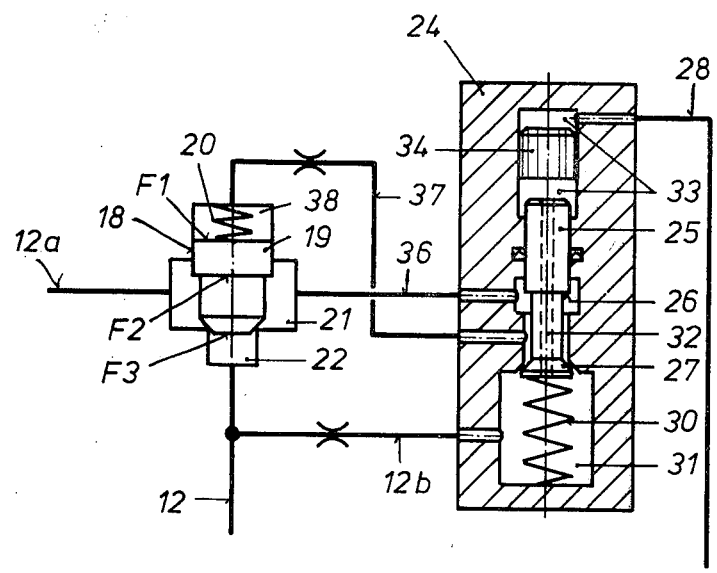

The stop valve 18 is associated with a leak-proof pilot control valve 24, shown symbolically in FIG. 1 and in section in FIG. 2. The construction of the pilot control valve 24 is conveniently explained in detail by reference to the sectional drawing of FIG. 2 and corresponding reference numerals in the symbolic representation of FIG. 1 are repeated.

The pilot control valve 24 comprises a spool 25 with a control land 26 and a ring seat valve 27 by virtue of which the pilot control valve can be described as leakproof. In the downwardly oriented control direction of the spool 25, its end face is subjected to a pilot pressure which is supplied via the duct 28. The duct 28 is connected via the inlet 29 to the pipeline antiburst safety device 7. The pilot pressure in the duct 28 is normally applied and disappears in the event of a pipe burst as will be explained subsequently. In the other control direction the spool 25 is spring biased by a light spring 30. The said spring 30 is disposed in a pressure chamber 31 into which a branch duct 12b of the first main control duct 12 extends, which said duct normally carries operating pressure. The spool 25 has a central passage 32 which interconnects the pressure 31 with the pressure chamber 33 of the pilot control pressure, so that the spool 25 is relieved of the high operating pressure in the first main control duct 12, thus permitting the use of a small force of the compression spring 30 for moving the spool 25 in the event of failure of the pilot pressure in the duct 28. The pressure chamber 33 is also subdivided by a floating spool 34 in order to isolate the pilot pressure circulation from the working pressure circulation.

In addition to the previously mentioned inlet for the branch 12b, the pilot control valve 24 also has two inlets for ducts 36, 37, of which the duct 36 extends to the annular chamber 21 with the annular surface area F2 and the duct 37 extends to the spring bias pressure chamber 38 with the largest spool surface area F1 of the control valve 18. In the position of the spool 25 of the pilot valve 24 as illustrated in FIG. 2, the ring seat valve 27 is closed and the two ducts 36 and 37 communicate with each other because of the position of the control land 26. In another control position the duct 36 is closed by the control land 26 and the ring seat valve 27 is opened so that the working pressure from the first main control duct 12 is applied via the duct 37 to the pressure chamber 38 of the stop valve 18.

Returning now to the pipeline antiburst safety device 7 in FIG. 1, the duct extension 12a for the working pressure is connected via a non-return valve 40 to a pressure retaining accumulator 41 from which retaining pressure is supplied in known manner to the drive cylinder 1 in the event of a pipe burst and the stop valve 18 will then of course be closed. Furthermore, a pressure limiting valve 42 is connected between the duct extension 12a which carries the constant high operating pressure on the outlet side of the stop valve 18 and the second main control duct 13 which extends from the inlet 15 to the outlet 17 of the pipeline antiburst safety device and then extends into the delivery chamber 1b of the cylinder 1 so as to restrict the maximum pressure drop between the high pressure and low pressure sides of the cylinder 1. This is also known.

The final part of the description is devoted to the extent of the duct 28 which carries the pilot pressure and the manner in which the pilot pressure is generated and ceases in the event of a pipe burst except in the special case in which the pilot duct itself bursts. The control duct 28 extends to a two-way valve 45 which connects the pilot duct 28 to a pilot pressure source 45a in the event of external pilot control. In the first main control duct 12, which normally carries high operating pressure, there is provided a volumetric flow measuring device 46 with a signal transducer which delivers a signal through duct 46a to central 51 for changing over the two-way valve 45 in the event of a pipe burst in the main control duct so that the duct 28 and the pressurized chamber 33 of the pilot valve 24 is pressure relieved. A volumetric flow measuring device, for example, operating in accordance with the gear pump principle, is preferred because even the smallest amount of leakage in the system can thus be indicated and signalled. Signal delivery from the flow measuring device 46 to the control system of the two-way valve 45 is of course arranged so that the two-way valve 45 is changed over only in the event of a pipe burst or if the amount of leakage becomes excessive.

The method of operation of the hydraulic control system described hereinabove with a pipeline antiburst safety device is as follows:

The main control valve is normally set in control position I so that the first main control duct 12 maintains the working pressure in the delivery chamber 1a of the cylinder 1 via the stop valve 18. The spool 19 of the stop valve 18 will then be in the "quasi closed position" which means that it opens in the event of a slight pressure rise in the annular chamber 21 of the stop valve 18 and by releasing the pipeline extension 12a as well as the delivery chamber 1a with the main control duct 12 ensures that the working pressure in the delivery chamber 1a is maintained at a constant value. This effect is responsible for the desirable "breathing" of the cylinder 1 if due to operating conditions a higher reaction is imposed by the slab 5 via the guide roller 4 on the piston rod 3 and the piston 2 than would normally be present. This quasi closed position of the stop valve 18 is based on the following:

Since the spool 25 of the pilot valve 24 is driven downwardly against the spring 30 when pilot pressure is applied to the pressure chamber 33, it follows that the duct 36 extending to the annular chamber 21 of the stop valve 18 is closed but the ducts 12, 12b and 37 communicate via the opened ring seat valve 27. The same hydraulic pressure, namely the operating pressure, is therefore applied to all three control surfaces F1, F2 and F3. Owing to the fact that F1 is equal to F2+F3, it follows that the valve spool 19 is indifferent in terms of applied forces and is merely subject to the pressure of the weak compression spring 20 in the pressure chamber 38, which keeps the valve spool lightly closed on its seat in the region of the control circuits F3. A slight pressure increase in the delivery chamber 1a of the cylinder 1 leads to a pressure increase in the annular chamber 21 of the stop valve 18 which is closed via the duct 36, and by virtue of the annular surface F2, the said pressure increase gives rise to a force acting against the force exerted by the spring 20 to overcome the force of the said spring 20 and to open the stop valve 18.

If the flow measuring device 46 comes into operation in the event of a pipe burst and a signal is delivered to reverse the two-way valve 45, the pilot ducts 28 and the pressure chamber 33 in the pilot valve 24 will be pressure relieved. The spring 30 in the pilot valve will then momentarily close the ring seat valve 27 and at the same time the control land 26 will release the communicating connection between the two ducts 36 and 37, which corresponds to the control position illustrated in FIG. 2 and in the symbolic diagram of the pilot valve 24 shown in FIG. 1. As a consequence the first main control duct 12, which has been depressurized as a result of the pipe burst, is not only closed with respect to the pressure chamber 31 in the pilot valve but the pressure from the annular chamber 21, fed by the pressure maintaining accumulator via the opening non-return valve 40 into the pipeline extension 12a, is now also applied to the pressure chamber 38 of the stop valve 18. Since the endface control surface F3 of the valve spool 19 is pressure relieved in the event of a pipe burst, it follows that the differential force $P \times F1 - P \times F2$ acts on the valve spool 19 if P is the pressure in the pressure retaining accumulator 41 plus the pressure of the spring 20. The stop valve 18 will then be in an actual unvarying closed position until pressure is restored in the main control duct 12.

To prevent the entire tank contents being discharged in the event of a pipe burst with the main control valve 11 in the normal control position I, the main control valve 11 will be set into a middle control position III in which both main control ducts 12 and 13 are pressure relieved. This control function is triggered by a signal of the flow measuring transducer 46 in duct 46a to valve control 52, simultaneous with the reversal of the two-way valve 45.

The most important advantage of the hydraulic control system with the pipeline antiburst safety device according to the invention is that in normal operation the stop valve 18 anticipates a pipe burst in the closed position so that in the event of failure of the operating pressure in the main control duct 12 the pressure in the delivery chamber 1a of the drive cylinder 1 is momentarily retained by the pressure retaining accumulator 41, so that the guide roller 4 cannot retract and bulging in the strand 5 and consequential strand fractures are avoided. The closed position of the valve spool 19 is however only a quasi closed position, since—as already described—the valve spool 19 is able to open slightly against the force of the spring 20, set to a low value.

As already mentioned, it is possible to describe the system as external pilot control if the pilot control pressure in the pressure chamber 33 of the pilot valve 24 is made available externally from a separate pressure source. The pipeline antiburst safety device 7 is also arranged for internal pilot control by virtue of the pilot valve or the pilot control duct 28 communicating via a closable branch duct (28a) (FIG. 1) with the second main control duct 13 and does not communicate with the two-way valve which is not provided for internal pilot control or is defective. This step has the following significance.

Flow from the pressure source 8 to 10 to the cylinder 1 is ensured by a spring-biased non-return valve 50 which is disposed parallel to the stop valve 18 and operates in the same sense, and is situated between the pipeline extension 12a on the outlet side of the stop valve 18 and the first main control duct 12. Return flow from the cylinder 1 to the pressure source on the other hand remains blocked because the stop valve 18 as well as the non-return valve 50 is closed if the pilot pressure in the duct 28 is absent. However, if the second main control duct 13 carries working pressure when the main control valve 11 is reversed, the pilot valve 24 will be driven via the opened branch duct 28a so that the spool 19 of the stop valve 18 is raised off its seat and releases return flow from the cylinder chamber 1a, since the first main control duct 12 and therefore the pressure chamber 38 of the stop valve are then pressure relieved.

During this opening motion only the annular surface F2 of the spool 19 will be biased by the displacement pressure from the cylinder chamber 1a.

The pipeline antiburst safety device 7 is optionally arranged for external or internal pilot control by virtue of the fact that a plug 49 is provided in the branch duct 28a for closing the said duct if the two-way valve 45 is connected to the duct 28 and which said plug is released if the inlet 29 for the duct 28 is closed for the purpose of internal pilot control. It will be understood that in internal pilot control, in which the pilot control valve 24 is not driven in normal operation, "breathing" of the cylinder 1 is achieved by the discharge of pressure fluid via the pressure limiting valve 42, which said pressure fluid is replaced via the non-return valve 50 in the same way as for leakage losses in the cylinder.

What is claimed is:

1. A hydraulic control system with a pipeline antiburst safety device for a double acting drive cylinder for adjusting and securing the position of a machine part, comprising:

a high pressure source for providing a working pressure, first and second main control ducts extending to said drive cylinder, said first main control duct normally carrying working pressure which acts opposite to an operationally conditioned reaction force that is normally applied to the piston of said cylinder, a main control valve connected in said first and second main control ducts, said main control valve having two control positions for alternatively controlling the ducts for providing working pressure and return flow, and a control position for relieving said main control ducts in the event of a pipeline burst, a leak-proof stop valve situated close to the drive cylinder and disposed within the first main control duct, said stop valve having a compression spring and a valve spool with three control surfaces, namely (a) a largest control surface which is spring-biased by said compression spring in the closing direction, (b) an annular surface within an annular chamber having an outlet communicating through an extension of the first main control duct with a corresponding working pressure chamber in the drive cylinder and (c) an end surface disposed within a pressure chamber into which said first main control duct extends, and which constantly carries operating pressure, wherein the largest control surface opposes and is equal in area to the sum of areas of the two other surfaces, so that the valve spool closes and is maintained closed exclusively by pressure from said compression spring which acts on the largest control surface when all surfaces are biased by the same hydraulic pressure, a non-return valve, arranged parallel with the stop valve and biased closed by means in the same sense as said stop valve between said extension of said first main control duct and the first main control duct, a leak-proof pilot valve situated close to the stop valve and having a spool which is biased in one control direction via a pilot duct by a normally applied pilot pressure and is spring-biased in the other control direction by a spring in a pressure chamber communicating with the first control duct, said pilot valve spool being operative to release working pressure from the first main control duct into a duct which extends into the spring-biased pressure chamber of the stop valve when pilot pressure is applied and to close the connection of the spring-biased pressure chamber with the first main control duct and connect the duct which extends to the spring-biased pressure chamber of the stop valve to a duct which extends to the annular chamber of the stop valve with the annular surface when pilot pressure is removed, a means for applying pilot pressure to said pilot duct when no pipe burst is present and removing pilot pressure from said pilot duct when a pipe burst is present, a pressure maintaining accumulator connected via a non-return valve to the extension of the first main control duct, and a pressure limiting valve between the extension from the outlet of the stop valve and the second main control duct for limiting maximum pressure.

2. A control system as claimed in claim 1 wherein the pilot valve is provided with a ring seat valve for closing the first main control duct.

3. A control system as claimed in claim 1 wherein said means includes a volumetric flow measuring device in the first main control duct which includes a signal transducer which delivers a signal in the event of a change in volumetric flow indicating a pipe burst in the main control duct and means responsive to said signal for removing pilot pressure from a pilot duct which extends to the pilot valve and normally carries pilot pressure.

4. A control system as claimed in claim 1 wherein a closable branch duct is provided between the second main control duct and the pilot duct and including means for closing said branch duct.

5. A control system as claimed in claim 3 wherein the signal delivered by the flow measuring device in the event of a pipeline burst is further supplied to the main control valve to set the said valve into the control position in which both main control ducts are pressure-relieved.

* * * * *